Patented June 27, 1939

2,164,140

UNITED STATES PATENT OFFICE 2,164,140

METHOD OF CONVERTING NATURAL RUBBER OR THE LIKE QUICKLY INTO RUBBER HYDROCHLORIDE

Gengo Mochizuki, Shiba-ku, Tokyo, Japan, assignor of one-half to Masataro Konishi, Saitama-ken, Japan No Drawing. Application October 12, 1937, Serial No. 168,569

1 Claim. (Cl. 260—111)

The present invention relates to a method of manufacturing rubber hydrochloride most economically in a short time, which consists in adding metallic salts to raw rubber solution, oxy rubber solution or the like solutions such as of latex, gutta percha, jelutong and synthetic rubber and causing hydrogen chloride gas to act upon the above mixture.

Hitherto, to manufacture rubber hydrochloride from raw rubber, the raw rubber has been dissolved in benzol and acted upon by hydrogen chloride gas for about 16 hours. But its action is too slow to obtain the desired product easily and accordingly economically. Now, the inventor after various studies has succeeded in manufacturing rubber hydrochloride quickly and economically in a very short time by causing hydrogen chloride gas to act upon rubber solution or the like in the presence of metallic salts.

The following is an example of carring out the present invention into practice:

If after adding 0.1–0.5 part of stannic chloride or about 0.1–0.5 part of aluminium chloride to a solution of about 10 parts of raw rubber in about 500 parts of benzol, hydrogen chloride gas is blown thereinto, suitable rubber hydrochloride will be obtained in nearly 1½ to 2 hours in case of adding stannic chloride, while in case of the employment of aluminium chloride it is about 3 hours. In this way, it is possible to obtain rubber hydrochloride which has big toughness.

Dissolve in 100–200 parts of chloroform 10 parts of the refined rubber hydrochloride obtained by precipitating this rubber hydrochloride with alcohol and then filtering, washing and drying the precipitate. Next, after attaching to the staple fibre by immersion or other means said solution mixed with 200–400 parts of benzol and some quantities of animal or vegetable oil or paraffin and hydrogenated oil as plastic materials and trichlorphosphate and a suitable solvent, form a film around said staple fibre by volatilizing the solvent and thus make the staple fibre waterproof. Such staple fibre does not have its softness spoiled, nor does it lose its waterproofing nature.

The above object may be attained also by de-acidifying the rubber hydrochloride which has not been treated with alcohol and is in a colloidal state in benzol solution.

The rubber hydrochloride of this invention may also be used for waterproofing Cellophane or other transparent films. In this case, the Cellophane and other transparent films are coated with a solution of 10 parts of refined dried rubber hydrochloride in a mixture of 100 parts of chloroform, 200–300 parts of benzol, 10–20 parts of cyclohexanon and 0.1–5 parts of stearin or liquid paraffin and 0.5–2.0% of resin, for instance, a benzol soluble substance such as Albert resin.

As to the other way of utilizing the rubber hydrochloride of the present invention, if fabrics are manufactured by making the rubber hydrochloride, which has not been treated with alcohol and is in a colloidal state in benzol solvent and has been de-acidified by ammonium or other chemicals, into a fibre or yarn with the dry process artificial silk spinning apparatus, it is possible to obtain the fibre which wears well on account of stannic chloride. Such fibre may be manufactured into a waterproof, acidproof and alkaliproof fabric. Especially, being electrically insulating and uninflammable, it may be utilized for covering electric wires. Moreover, it makes a fine filtering cloth for use in chemistry. Furthermore, being a white fine fibre resembling the wool and natural silk, it is fit for being woven with the wool, natural silk, staple fibre and artificial silk.

I claim:

The method of producing rubber hydrochloride which consists in forming a solution of approximately 10 parts of raw rubber in approximately 500 parts of benzol, adding 0.1 to 0.5 part of stannic chloride to said solution, and causing hydrogen chloride in gaseous state to be blown into said mixture.

GENGO MOCHIZUKI.